United States Patent
Hepkin et al.

(10) Patent No.: US 7,484,072 B2
(45) Date of Patent: *Jan. 27, 2009

(54) PAGE REPLACEMENT POLICY FOR SYSTEMS HAVING MULTIPLE PAGE SIZES

(75) Inventors: David Alan Hepkin, Austin, TX (US); Thomas Stanley Mathews, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/026,334

(22) Filed: Feb. 5, 2008

(65) Prior Publication Data

US 2008/0126737 A1    May 29, 2008

Related U.S. Application Data

(63) Continuation of application No. 11/146,476, filed on Jun. 6, 2005, now Pat. No. 7,353,361.

(51) Int. Cl.
    *G06F 12/00* (2006.01)

(52) U.S. Cl. .................... 711/203; 711/206
(58) Field of Classification Search .............. None
    See application file for complete search history.

(56) References Cited

U.S. PATENT DOCUMENTS 6,804,766 B1 * 10/2004 Noel et al. ............... 711/203

* cited by examiner

*Primary Examiner*—Reginald G Bragdon
*Assistant Examiner*—Ngoc V Dinh
(74) *Attorney, Agent, or Firm*—Matthew W. Baca; Dillon & Yudell LLP

(57) ABSTRACT

In a data processing system utilizing multiple page sizes for virtual memory paging, a system, method, and article of manufacture for managing page replacement. In one embodiment, the page replacement method begins with a page frame allocation request, such as may be generated following a page fault. A page replacement procedure is invoked to select one or more pages to be replaced by the requested page(s). In a preferred embodiment, the page replacement includes a step of selecting, in accordance with a page type allocation of at least one of the multiple page sizes, a page size to be utilized for page replacement for the page frame allocation request.

6 Claims, 3 Drawing Sheets

PAGE REPLACEMENT POLICY FOR SYSTEMS HAVING MULTIPLE PAGE SIZES

CROSS-REFERENCE TO RELATED PATENT APPLICATION

The present patent application is a continuation of U.S. patent application Ser. No. 11/146,476, filed on Jun. 6, 2005 now U.S, Pat. No. 7,353,361, and entitled "Page Replacement Policy for Systems Having Multiple Page Sizes," which is assigned to the assignee of the present invention and incorporated herein by reference in its entirety.

BACKGROUND OF THE INVENTION

1. Technical Field

The present invention relates generally to management of computer memory resources, and in particular, to allocation and replacement of virtual memory pages. More particularly, the present invention relates to a system and method for managing page replacement operations in virtual memory systems employing multiple page sizes.

2. Description of the Related Art

Virtual memory is a critical feature supported by most modern operating systems in conjunction with memory management hardware. Virtual memory essentially provides an alternate set of memory addresses. Programs use these virtual addresses rather than real addresses to store instructions and data. When called by program threads, the virtual addresses are converted into physical or "real" memory addresses.

To facilitate copying virtual memory into real memory, almost all modern operating systems divide virtual memory into pages, each of which contains a fixed number of addresses. Each page is stored on a disk until it is needed. When a page is needed, the operating system copies it from disk to main memory, translating its virtual address into a real address. Basic to implementing virtual memory is the concept of demand paging, meaning the system (usually the operating system), and not the programmer, controls the replacement of pages in and out of main memory as required by active processes. When a non-resident page is needed by a process, the operating system utilizes a specified replacement policy to decide which resident memory page is to be replaced by the requested page. Most convention replacement policies, such as least recently used (LRU), first in first out (FIFO), etc., generally share the objective of selecting for replacement, a page that will not be referenced for the longest time.

To improve system performance, many computer architectures and operating systems have begun adding support for multiple page sizes. For example, in a system using two page sizes of 4K bytes and 64K bytes, the relative allocation of the memory between the page sizes is set by reserving specified portions of memory for the respective page sizes. To improve system reliability and usability, an operating system would ideally determine how much of a system's memory to use for each page size autonomically and dynamically adjust these amounts based on a particular workload demand at any given point in time.

When all of the page frames for a requested page size have been allocated, the operating system must determine how to handle further requests for page frames of that page size. Operating systems have traditionally had two basic options. First, page replacements may be started for page frames of the requested page size. In the alternative, currently non-allocated, or "free" memory reserved for a non-requested size may be converted to blocks of the requested page size and used in satisfaction of the page frame allocation requests. Using these options, the operating system is able to select the page size shift option over the more costly page replacement option when free page frames are available.

However, when memory utilization is sufficiently high such there are insufficient free page frames from any page size to satisfy an allocation request, page replacement (sometimes referred to as page swapping) must be utilized to free up memory to copy in the requested pages. There exists a need in the art to determine whether the page replacement should be performed with respect to the requested page size or other page sizes in a manner that improves system efficiency and reliability. The present invention addresses this and other needs unresolved by the prior art.

SUMMARY OF THE INVENTION

In a data processing system utilizing multiple page sizes for virtual memory paging, a system, method, and article of manufacture for managing page replacement are disclosed herein. In one embodiment, the page replacement method begins with a page frame allocation request, such as may be generated following a page fault. A page replacement procedure is invoked to select one or more pages to be replaced by the requested page(s). In a preferred embodiment, the page replacement includes a step of selecting, in accordance with a page type allocation of at least one of the multiple page sizes, a page size to be utilized for page replacement for the page frame allocation request. When an operating system receives a request for a page frame of a page size pool having a low level of available frames, the operating system checks if other page sizes have a significantly higher percentage of file pages that the requested page size. If they do, an operating system can target another page size for page replacement rather than the requested page size to minimize the amount of working storage memory that is paged and improve system performance.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention provides a mechanism by which an operating system, memory management unit, virtual memory manager, and/or other like devices or modules may select a page size with respect to which page replacement will be performed. As explained below in further detail with reference to the figures, the selection is preferably based on the level of utilization or allocation of one or more "types" of memory pages for each page size. As utilized herein, and in one embodiment, a page "type" may refer to a characterization of a type of data contained in a given page. In a preferred embodiment, the page type characterizes a given page as being either a persistent storage page (alternately referred to as a file storage page or simply a file page) containing persistent data, or as being a working storage page containing processing support data.

Figure 1:
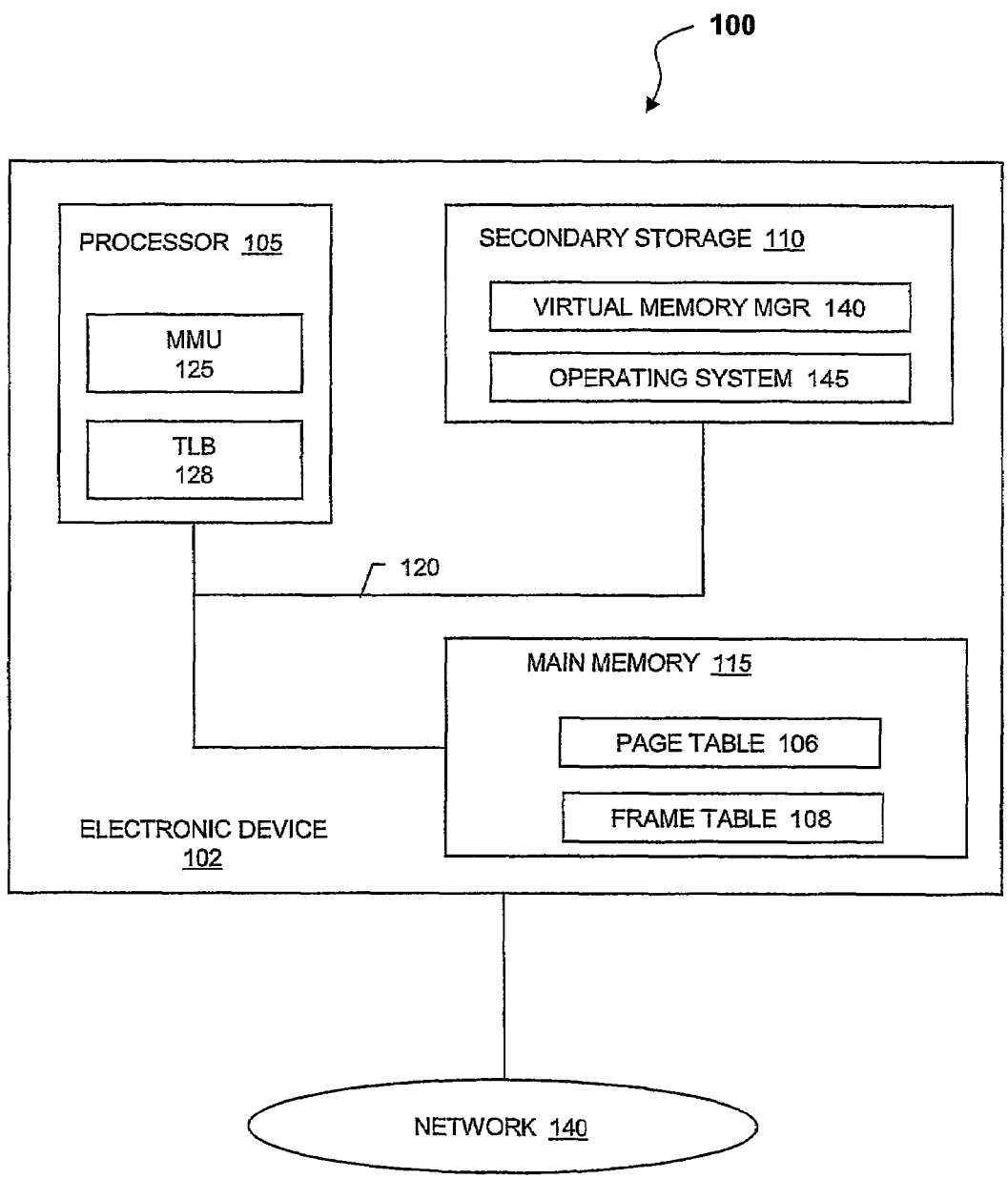
FIG. 1 is a block diagram depicting a data processing system adapted to implement an embodiment of the invention.

With reference now to the figures, wherein like reference numerals refer to like and corresponding parts throughout, and in particular with reference to FIG. 1, there is depicted a data processing system 100 adapted for implementing the present invention. For discussion purposes, the data processing system is described as a multi-processor computer system, such as may be used for large-scale server/storage applications. However, as used herein, the terms "data processing system," "computer," and the like, are intended to mean essentially any type of computing device or machine that is capable of running a software product.

Data processing system 100 includes an electronic device 102 communicatively coupled to a network 104. Electronic device 102 includes a processor 105 connected to a secondary storage 110 and a main memory 115 via an interconnect 120, which may comprise any combination of one or more shared busses or switched connections. Interconnect 120 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller). Although electronic device 102 is shown to contain only a single processor 105 and a single system interconnect 120, the present invention applies equally to electronic devices that may have multiple processors and multiple buses with some or all performing different functions in different ways.

Electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

Network 104 may be any suitable network or combination of networks and may support any appropriate protocol suitable for communication of data and/or code to/from electronic device 102. In various embodiments, network 104 may include a storage device or a combination of storage devices, either directly or indirectly connected to the electronic device 102.

Processor 105 represents one or more central processing units of any type of architecture, such as CISC (Complex Instruction Set Computing), RISC (Reduced Instruction Set Computing), VLIW (Very Long Instruction Word), or a hybrid architecture, although any appropriate processor may be used. Processor 105 executes instructions and includes that portion of electronic device 102 that controls overall system operation. In support of its control function, processor 105 reads and/or stores code and data to/from secondary storage 110 and/or main memory 115. Although not depicted in FIG. 1, processor 105 may include a variety of other elements not necessary to understanding the present invention. For example, processor 105 may typically include a variety of execution units for executing instructions during a processor cycle, a bus interface unit for interfacing to interconnect 120, a fetcher for fetching instructions, and queues and/or caches for holding instructions and data. In other embodiments, processor 105 includes other appropriate elements well known to those skilled in the art.

Secondary storage 110 represents one or more mechanisms for storing data. For example, the secondary storage 110 may include random access memory (RAM), magnetic disk storage media, optical storage media, flash memory devices, and/or other machine-readable media. In other embodiments, any appropriate type of storage device may be included within secondary storage 110. Although only one secondary storage 110 is shown, multiple storage devices and multiple types and levels of storage devices may be present. Furthermore, while depicted within electronic device 102, secondary storage 110 may be distributed across other electronic devices, such as when electronic devices are interconnected via network 104.

Secondary storage 110 includes a virtual memory manager 140. Virtual memory manager 140 includes electronic or software encoded instructions capable of being executed by processor 105 and/or statements capable of being interpreted by instructions that execute on processor 105 in performing page allocation and replacement as described below with reference to FIGS. 2 and 3. In one embodiment, some or all of the functions of virtual memory manager 140 may be implemented via logic gates and/or other hardware mechanisms. Virtual memory manager 140 may perform paging functions to move pages (including itself) between secondary storage 110 and main memory 115. The functions of the virtual memory manager 140 are further described below with reference to FIGS. 2 and 3.

Main memory 115 represents one or more mechanisms for storing data. For example, main memory 115 may include a cache or caches or random access memory of any appropriate type. Although only one main memory 115 is shown, multiple memories and multiple types and levels of memory may be present. In one embodiment, main memory 115 is smaller with a faster access time than secondary storage 110.

Processor 105 includes a memory management unit (MMU) 125 that accesses a page table 106 and a translation lookaside buffer (TLB) 128. Page table 106 may itself comprise a one or more memory pages and together with an associated virtual memory disk map (not depicted) describe the entire addressing space of data processing system 100. Page table 106 generally comprises page table entries identifying the pages in main memory 115, and the page frames in which those pages are contained. To this end, the page table entries of page table 106 contain various data fields and flags. In accordance with one embodiment such fields preferably include a presence flag that indicates whether the page is currently in main memory 115, a modified flag indicating whether the page data has been modified while in main memory 115, a page frame number (or other identifier) identifying the frame and thus the location in memory of the page.

The frame identifier included within the page table entries of page table 106 serves as an index into a frame table 108, which is also maintained by operating system 145 in support of virtual memory addressing. While page table 106 designates the identity and status of each page currently stored in main memory 115, frame table 108 includes entries corresponding to each memory frame that cumulatively describe current utilization (for example frames currently allocated to pages versus free frames) of main memory 115.

Memory management unit 125 is typically a hardware component, and includes executable instructions for managing virtual memory within electronic device 102. Memory management unit 125 maps virtual memory addresses to physical, or "real," memory addresses using page table 106. The translation function is facilitated by translation lookaside buffer 128 which maintains a table of recently used real-to-virtual translations. The functions of the memory management unit 125 are further described below with reference to FIGS. 2 and 3. Although memory management unit 125 is depicted within the block representing processor 105, in alternate embodiments, memory management unit 125 may be implemented fully or partially outside processor 105.

As will be described in detail below, aspects of an embodiment of the invention pertain to specific apparatus and method elements implemented on a computer, processor, or other electronic device. In another embodiment, the invention may be implemented as a program product for use with a computer, processor, or other electronic device. The executable instructions defining the functions of this embodiment may be performed by electronic hardware and/or may be delivered to the computer, processor, or other electronic device via a variety of signal-bearing media, which include, but are not limited to:

(1) information permanently stored on a non-rewriteable storage medium, e.g., a read-only memory device attached to or within a computer, processor, or other electronic device, such as a CD-ROM readable by a CD-ROM drive;

(2) alterable information stored on a rewriteable storage medium, e.g., a hard disk drive or diskette; or (3) information conveyed to a computer, processor, or other electronic device by a communications medium, such as through a computer or a telephone network, e.g., the network 104, including wireless communications.

Such signal-bearing media, when carrying machine-readable instructions that direct the functions of the present invention, represent embodiments of the present invention.

In accordance with the present invention, electronic device 102 includes an operating system 145 persistently maintained within secondary storage 110 and loaded in part or in whole into main memory 115 during system startup and operation. Operating system 145 of the present invention may include many of the features of standard high-performance operating systems, such as IBM's AIX®, that supports virtual memory in conjunction with the functionality provided by memory management unit 125 and virtual memory manager 140.

To enable copying virtual memory into real memory, operating system 145 divides virtual memory into pages, each containing a fixed number of addresses and each having a corresponding page table entry within page table 106. In AIX®, for example, virtual memory segments are partitioned into 4k (4096) byte page units and real memory is divided into 4 k-byte page frames. Each page is stored on a disk or other mass storage medium within secondary storage 110 until it is needed. When a page is needed, operating system 145 in conjunction with virtual memory manager 140 copies it from secondary storage 110 to main memory 115, translating its virtual address into a real address. The process of translating virtual addresses into real addresses is called mapping. The copying of virtual pages from disk to main memory is known as paging.

A page fault occurs each time a page is requested, such as by an application process, and is not currently in main memory 115. A page fault is typically an interrupt that prompts operating system 145 to fetch the requested data from secondary storage 110 and load it into main memory 115. One or more page frames within main memory 115 must therefore be allocated for receiving the requested page(s). For systems, such as that depicted in FIG. 1, that employ multiple page sizes (e.g. 4K, 64K, etc.), the main memory address space is divided among the respective page sizes. The present invention provides a system and method for allocating additional pages when current memory usage is such that a page replacement is presently or imminently required to handle a page frame allocation request generated such as in response to a page fault.

Figure 2:
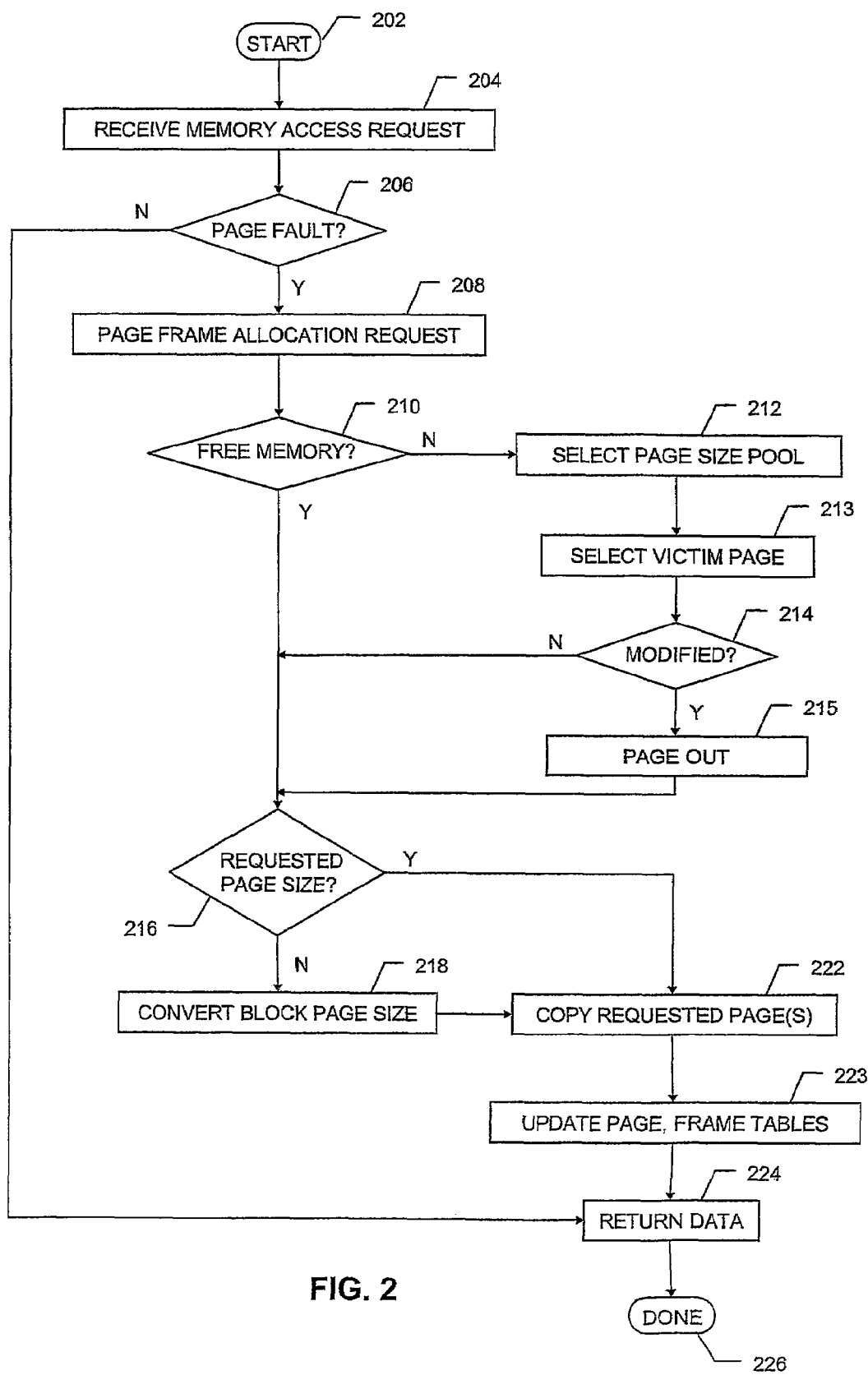
FIG. 2 is a high-level flow diagram illustrating steps performed for handling a memory access request in accordance with the present invention.

As described in further detail below with reference to FIG. 2, the present invention is directed to managing page allocation and replacement policy in a virtual memory system such as that utilized by data processing system 100. More specifically, the page frame allocation management of the invention utilizes a page replacement selection mechanism that selects a victim page size to be utilized for page replacement in accordance with individual or relative page type utilization of one or more of the multiple page sizes. As utilized herein page "type" may refers to the type of data stored in a particular file. In a preferred embodiment, page type refers to the distinction between persistent storage pages and working storage pages. More specifically, and in accordance with a preferred embodiment, the virtual memory pages contained within secondary storage device 110 and main memory 115 may be generally categorized as either persistent storage pages that are utilized to cache file data in main memory 115, or working storage pages that are utilized for processes' data heap, bss, stack, shared memory, and other process related functions. When working storage pages are replaced, or "paged-out," they are written to paging disk space. When persistent storage pages are paged-out, they are written to file system disk space.

It is often the case that the efficiency of page replacement is significantly impacted by the page type of the page sought to be replaced. For example, in almost any processing environment, paging out persistent storage pages is much more efficient that paging out working storage pages for several reasons. First, it is much more likely that an application's working set includes working storage pages that persistent storage pages. Therefore, processes are usually much more sensitive to extensions of access times to their working storage memory than persistent storage memory. Thus, paging out working storage pages can significantly impair performance due to process thrashing in which processes must wait for page-ins of their working sets. In addition, most high-end systems are configured with a small amount of paging space that is usually only spread among a very small number of disks. In contrast, most high-end systems have large file systems spread over numerous disks. Thus, the input/output (I/O) throughput of paging working storage data to/from paging space is usually much less that the I/O throughput for paging persistent storage data.

As explained below with reference to FIGS. 2 and 3, the page allocation/replacement mechanism of the present invention utilizes page type allocation per one or more of multiple available page sizes to select replacement pages to be paged or copied out for a current or anticipated page replacement operation. Referring to FIG. 2, there is depicted a high-level flow diagram illustrating steps performed for handling a memory access request in accordance with the present invention. The process begins as shown at steps 202 and 204 with a memory access request, such as a memory read request originating from an application process, received by main memory 115. If main memory 115 contains the requested data, the data is returned to processor 105 and the memory access procedure ends as illustrated at steps 206, 224, and 226.

In response to the requested data not being currently stored in main memory 115, a page fault interrupt is issued by memory management unit 125 (step 206), prompting operating system 145 to invoke a page fault handler. Included in the page fault handler routine is a page frame allocation request (step 208) issued to and processed by virtual memory manager 140 in conjunction with operating system 145. As previously explained with reference to FIG. 1, the virtual memory system of the present invention employs multiple page sizes such that, for example, main memory 115 may be divided between 4K and 64 K pages. As part of page frame allocation request processing, a requested page size is determined and specified in the request. The requested page size may be determined by reference to the address space of the requesting process for example.

As depicted at inquiry step 210, page frame allocation request processing further comprises determining whether any or a sufficient number of free pages (i.e. page frames presently unallocated to memory pages) are available to satisfy the allocation request such as by referencing free lists maintained in association with tables 106 and/or 108. If sufficient free memory is available such that page replacement in not necessary, but the free frames are not of the requested page size, the frames are converted to the requested page size and thus effectively shifted to the memory pool of the requested page size (steps 216 and 218). Following shifting of pages to the requested page size pool, or if free page frames of the requested page size pool are available, the requested page (s) is/are copied from secondary storage 110 into the designated free frame(s) in main memory 115 (steps 216, 222). Next, the tables 106 and 108 are updated to reflect the revised contents of main memory 115 (step 223), the requested data is returned to the requesting processor (step 224), and the process concludes (step 226) at which point the faulting process may retry the memory access request.

Returning to inquiry step 210, if insufficient free memory necessitates page replacement, a replacement procedure in accordance with the present invention is invoked. In accordance with the depicted embodiment, the replacement procedure begins as shown at step 212 with selecting, from among the multiple available page sizes, the page size pool from which one or more pages will be replaced. In accordance with the invention, the selection criteria for determining the page size pool to be utilized for page replacement includes the current allocation of one or more page types within the respective page size pools. In the preferred embodiment in which the page types include persistent storage pages and working storage pages, for example, the selection depicted at step 212 would comprise determining and possibly comparing the allocation of working storage pages and/or allocation of persistent storage pages in each of the respective multiple page size pools and selecting a replacement page size pool in accordance therewith.

Figure 3A:
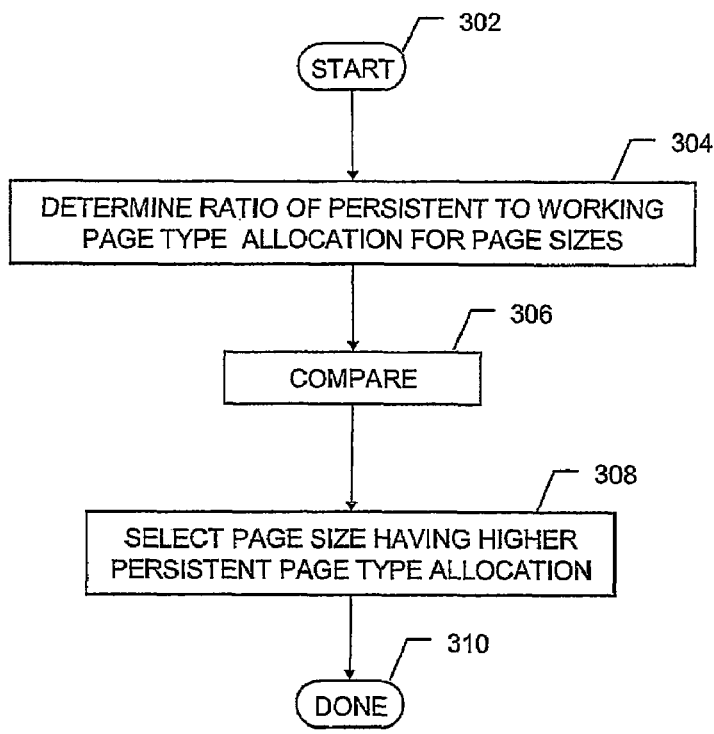
FIG. 3A is a high-level flow diagram depicting steps performed for handling a page replacement in accordance with one embodiment of the present invention.
Figure 3B:
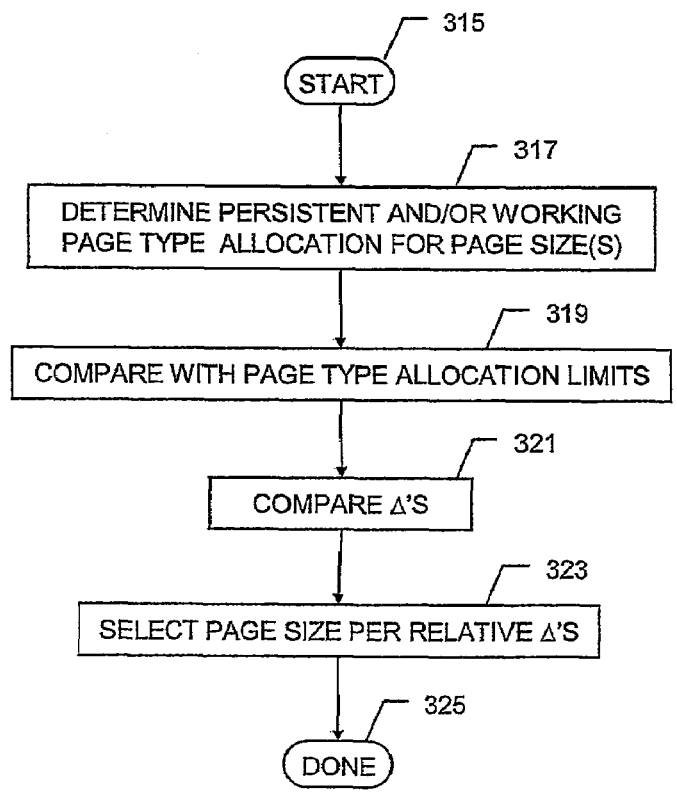
FIG. 3B is a high-level flow diagram depicting steps performed for handling a page replacement in accordance with an alternate embodiment of the present invention.

More detailed embodiments for performing the page size pool selection at step 212 are illustrated with reference to FIGS. 3A and 3B. Specifically, FIGS. 3A and 3B are high-level flow diagrams depicting selection processes that may be utilized for selecting the page size from which the victim replacement pages will be overwritten and possibly copied out in accordance with alternate embodiments of the present invention. The embodiments shown in FIGS. 3A and 3B assume that the page types utilized by the virtual memory system include working storage pages and persistent storage pages. It should be noted, however, that alternate embodiments using analogous procedures to those depicted and described with reference to FIGS. 3A and 3B may utilize other page type categorizations without exceeding the intended scope of invention.

The first embodiment shown in FIG. 3A begins as illustrated at steps 302 and 304 with a determination of the allocation of page frames of each respective size to persistent or working storage type pages. More specifically, and in accordance with a first embodiment, the ratio of page frames currently allocated to persistent storage pages to working storage pages for each page size pool is determined. Next, the ratios for each page size pool are compared (step 306) and the page size pool having a relative higher persistent page type allocation (or conversely, the page size pool having a relative lower working page type allocation) is selected as the replacement pool and the page size pool selection process ends (steps 308 and 310).

The second embodiment shown in FIG. 3B begins as depicted at steps 315 and 317 with a determination of the page frames allocated to persistent storage pages and/or the page frames allocated to working storage pages for each of the multiple page sizes. As shown at step 319, either one or both of the determined page type allocations for the persistent storage pages and/or the working storage pages are compared with pre-specified allocation limits for each page size. For example, the virtual memory manager 140 may include a persistent page type limit that limits the amount or percentage of main memory 115 to be allocated to persistent pages to specified values for the respective page sizes. In this case, the comparison shown at step 319 may comprise, for each page size, comparing the current allocation of persistent pages determined at step 317 with the corresponding page-size-specific persistent page limit. The page size pool may be selected in accordance with the compliance or non-compliance of any given page size pool with its respective limit(s). In the alternative, and as shown at steps 321 and 323, the page size pool may be selected by comparing the relative compliance of each page size pool with its respective limit(s) and the page size pool selection process ends at step 325.

Returning to FIG. 2, following the selection of a replacement page size pool, such as by the processes depicted in FIGS. 3A and 3B, the page replacement procedure continues as shown at step 213 with the selection of one or more pages to be replaced from the selected page size pool. Many known victim page selection techniques, such as LRU, are known and may be utilized consistent with the spirit and scope of the present invention. As part of the replacement page selection, the page frame number of the page frame that will be utilized for the incoming page is obtained. As illustrated at step 214, if the page selected per step 213 has been modified, possibly as indicated in the corresponding page table entry within page table 106, the memory version of the page must be copied out to secondary storage 110 (step 215). Following selection of the replacement page(s) and possible page-out, the page fault process continues with the requested page(s) being copied from secondary storage 110 into the selected replacement page frame(s) in main memory 115 as shown at step 222. As illustrated at steps 216 and 218, if the selected page frame(s) is different than the requested page size, the frames are first converted to the requested page size and thus shifted to the memory pool of the requested page size. Next, the tables 106 and 108 are updated to reflect the revised contents of main memory 115 (step 223), the requested data is returned to the requesting processor (step 224) and the process concludes (step 226) at which point the faulting process may retry the memory access request.

In accordance with the foregoing method and system, when an operating system receives a request for a page frame of a page size pool having a low level of available frames, the operating system checks if other page sizes have a significantly higher percentage of file pages that the requested page size. If they do, an operating system can target another page size for page replacement rather than the requested page size to minimize the amount of working storage memory that is paged and improve system performance.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. In a data processing system utilizing multiple page sizes for virtual memory paging, a system for managing page replacement, said method comprising:

means for receiving a page frame allocation request; and means for selecting, in accordance with a page type allocation of at least one of the multiple page sizes, a page size to be utilized for page replacement for said page frame allocation request; and means, responsive to the selected page size not matching a page size specified by the page frame allocation request, for converting page frames having the selected page size to page frames having the requested page size.

2. The system of claim 1, further comprising means for determining a page type allocation of at least one of the multiple pages sizes.

3. The system of claim 2, said means for determining a page type allocation of at least one of the multiple pages sizes further comprising comparing a page type allocation of a first page size with a page type allocation of a second page size.

4. The system of claim 2, said means for determining a page type allocation of at least one of the multiple page sizes further comprising comparing the page type allocation of at least one of the multiple page sizes with a page type allocation limit.

5. The system of claim 2, wherein page types of the multiple page sizes include persistent storage pages and working storage pages, said determining a page type allocation of at least one of the multiple page sizes comprising determining memory allocation of persistent storage pages or working storage pages for at least one of the multiple page sizes.

6. The system of claim 5, said means for selecting step comprising means for selecting a page size in accordance with the allocation of persistent storage pages or working storage pages for at least one of the multiple page sizes.

* * * * *

UNITED STATES PATENT AND TRADEMARK OFFICE
CERTIFICATE OF CORRECTION

PATENT NO. : 7,484,072 B2
APPLICATION NO. : 12/026334
DATED : January 27, 2009
INVENTOR(S) : David Alan Hepkin and Thomas Stanley Mathews It is certified that error appears in the above-identified patent and that said Letters Patent is hereby corrected as shown below:

Claim 1, Column 9, Line 19, after "replacement", delete ", said method"

Signed and Sealed this
Twenty-second Day of March, 2011

David J. Kappos
*Director of the United States Patent and Trademark Office*